United States Patent
Wheeler et al.

[11] Patent Number: 5,287,825
[45] Date of Patent: Feb. 22, 1994

[54] CONTAINER FOR HOUSING NEWBORN ANIMALS AND THE LIKE

[76] Inventors: Thomas R. Wheeler; Vicki F. Wheeler, both of 47265 Ottawa Dr., Coarsegold, Calif. 93614

[21] Appl. No.: 993,703

[22] Filed: Dec. 21, 1992

[51] Int. Cl.⁵ .................................................. A01K 1/02
[52] U.S. Cl. ........................................................ 119/20
[58] Field of Search ............... 119/17, 19, 20, 165, 119/166, 167, 168, 169, 170, 174, 28.5; 229/168, 178

[56] References Cited

U.S. PATENT DOCUMENTS

| | | |
|---|---|---|
| 2,741,223 | 10/1956 | Winborn, Jr. ................. 119/165 |
| 3,325,079 | 6/1967 | Puckett ..................... 229/168 X |
| 3,377,990 | 4/1968 | Mitchell .................... 119/165 |
| 3,895,754 | 7/1975 | Rosenburg, Jr. . |
| 3,941,093 | 3/1976 | Sievers et al. . |
| 4,274,363 | 6/1981 | Root . |
| 4,501,226 | 2/1985 | Bienvenn et al. .............. 119/168 |
| 4,548,160 | 10/1985 | Feitelson ................... 119/168 |
| 4,553,671 | 11/1985 | Cheesman ................ 119/168 X |
| 4,766,845 | 8/1988 | Bavas ....................... 119/165 |
| 5,080,044 | 1/1992 | Bosworth ................... 119/168 |

Primary Examiner—Gene Mancene
Assistant Examiner—Thomas Price
Attorney, Agent, or Firm—Worrel & Worrel

[57] ABSTRACT

A container for housing mobile work objects having a wall assembly enclosing an area to which the work objects are to be confined; and a panel borne by the wall assembly for resisting movement of the work objects over the wall assembly whereby the work objects can be confined to the area.

8 Claims, 5 Drawing Sheets

CONTAINER FOR HOUSING NEWBORN ANIMALS AND THE LIKE

BACKGROUND OF THE INVENTION

1. Field of the Invention:

The present invention relates to a container for housing mobile work objects and, more particularly, to such a container which is uniquely well suited to housing infant animals during the period immediately after birth affording protection and confining them to a proscribed area.

2. Description of the Prior Art:

It is well known that newborn animals require care during their infancy to an extent equivalent to that required by human infants. It is also known that pregnant female animals perform better in the care of the infants if they are allowed to adapt to the area in which they will give birth and thereafter nurse the infant animals. One result of the recognition of these considerations is the use of appliances known as "whelping boxes." "Whelping," or birthing, is the appellation applied to such devices which are intended for use both before and after the birth. For example, the period of gestation for canines averages about sixty-three days. It is known that the pregnant female performs better, both during and after birth, if placed in a confined, or whelping area, about fifty to fifty-five days into the period of gestation. This allows the pregnant female to adapt her surroundings, to be comfortable during the birth and to care for the newborn puppies after birth.

Following delivery, the infant animals benefit from significantly enhanced care if they are confined to a whelping box with the female. The infants require the warmth of each other and the mother for optimum development. Housing of the infants in a confined area prevents their wondering off where they do not have the benefit of the warmth and do not have access to the mother for nursing. Retaining the infants in a confined area also encourages the mother to care for them, to clean them and otherwise care for their needs.

There are, however, significant problems with the use of conventional whelping boxes. By confining the infants to a small area, the mother may inadvertently suffocate, or otherwise injure, one or more of the infants, particularly where the infant becomes isolated from the others between a wall of the whelping box and the back of the mother. While it has been known to construct whelping boxes with a recessed area defined by a ledge extending inwardly of the confining area from the walls of the whelping box and upwardly spaced from the floor, such conventional structures have not proven entirely satisfactorily. In such conventional structures, the isolated infant is provided with a recessed area in which it may inadvertently be pushed by the adult female, but which prevents the mother from suffocating or otherwise injuring the infant. However, such conventional structures serve as a step for the infant animals as they develop permitting them to escape from the confining area prior to their being sufficiently developed.

Other problems associated with the use of conventional whelping boxes include the fact that they are of an inconvenient size to permit them conveniently to be transported and stored. While this problem is encountered to one degree or another in all instances of use, in the case of private and commercial breeders, veterinary hospitals, zoological facilities and the like, these problems are compounded by the number and frequency with which they must be employed. A direct consequence of this inconvenience is that such whelping boxes are actually employed in significantly fewer instances than would be desirable.

Therefore, it has long been known that it would be desirable to have a container for housing mobile work objects which is uniquely well suited to use as a confining area for infant animals; which affords the capability of protecting the infant animals from inadvertent injury from the mother; which prevents the infant animals from escaping from the confining area until they are sufficiently developed; which avoids the problems associated with conventional devices designed for the same purpose; and which is significantly less expensive to purchase and use than has heretofore been possible.

SUMMARY OF THE INVENTION

Therefore, it is an object of the present invention to provide an improved container for housing mobile work objects.

Another object is to provide such a container which is uniquely well suited to confining animals before and after birth to an area so as to enhance the care and development of the infant animals during their initial development.

Another object is to provide such a container which affords a compartment accessible by infant animals affording protection against suffocation or other inadvertent injury by the mother.

Another object is to provide such a container which prevents the infant animals from escaping from the confining area until they are sufficiently developed to survive.

Another object is to provide such a container which possesses a flexibility in use suited to the particular needs of the operator permitting them to be sold in flattened blanks for assembly when the need arises and which, once assembled, can be used one or more times, collapsed and stored in a convenient size and configuration, or employed on a disposable basis wherein each container need only be employed once and thereafter can be disposed of at a cost which is entirely consistent with practical usage.

Another object is to provide such a container which possesses sufficient strength and durability repeatedly to be erected for use and subsequently collapsed for storage over a long operational life, but which is sufficiently inexpensive for disposal at any time such repeated usage becomes less than desirable.

Another object is to provide such a container which can conveniently and dependably be manipulated through several assembly and, alternatively, disassembly steps between the fully assembled and collapsed configurations.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the present invention, by a container for housing one or more infant and adult animals having a substantially flat bottom adapted to be rested on a service of support; a wall mounted on the bottom in upstanding relation and, with the bottom, defining a confining area for the animals accessible through a mouth bounded by the wall; and a panel borne in covering relation to the wall within the confining area and so configured as to form a projection upwardly spaced from the bottom and inwardly spaced from the wall to define a recess for receiving an infant animal to protect the infant animal from an adult animal which would otherwise lay thereon and a confining member, extending upwardly and outwardly from the projection and to the mouth in a configuration resisting movement by the infant animals through the mouth and from the confining area.

DESCRIPTION OF THE PREFERRED EMBODIMENT

Figure 6:
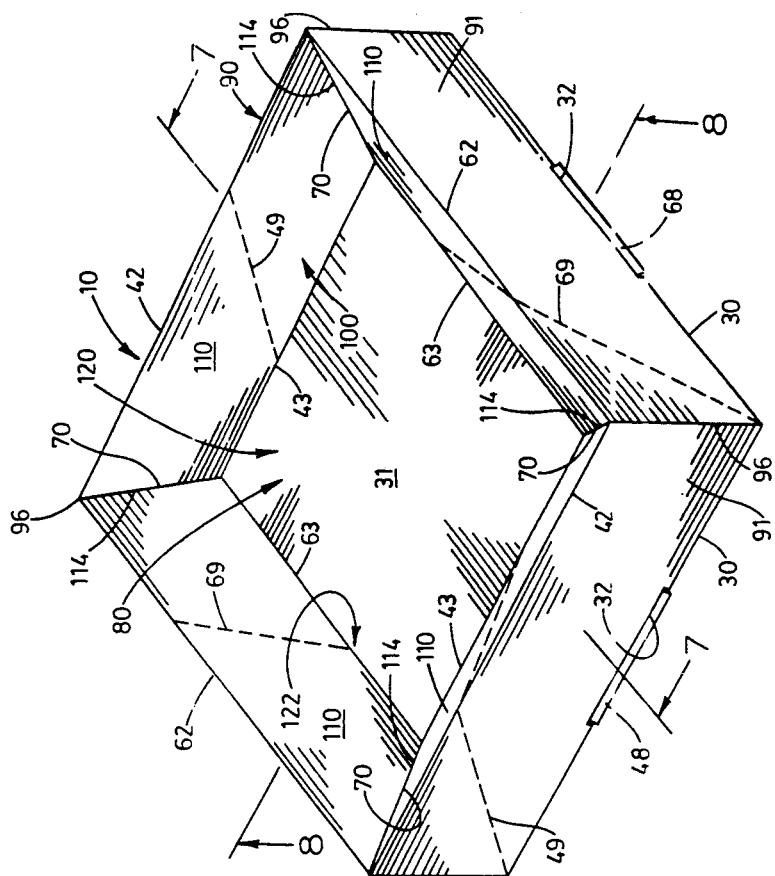
FIG. 6 is a perspective view of the container of FIGS. 2, 3, 4 and 5 shown in a fully assembled configuration.

Referring more particularly to the drawings, the whelping box or container of the present invention is generally indicated by the numeral 10 in FIG. 6.

Figure 1:
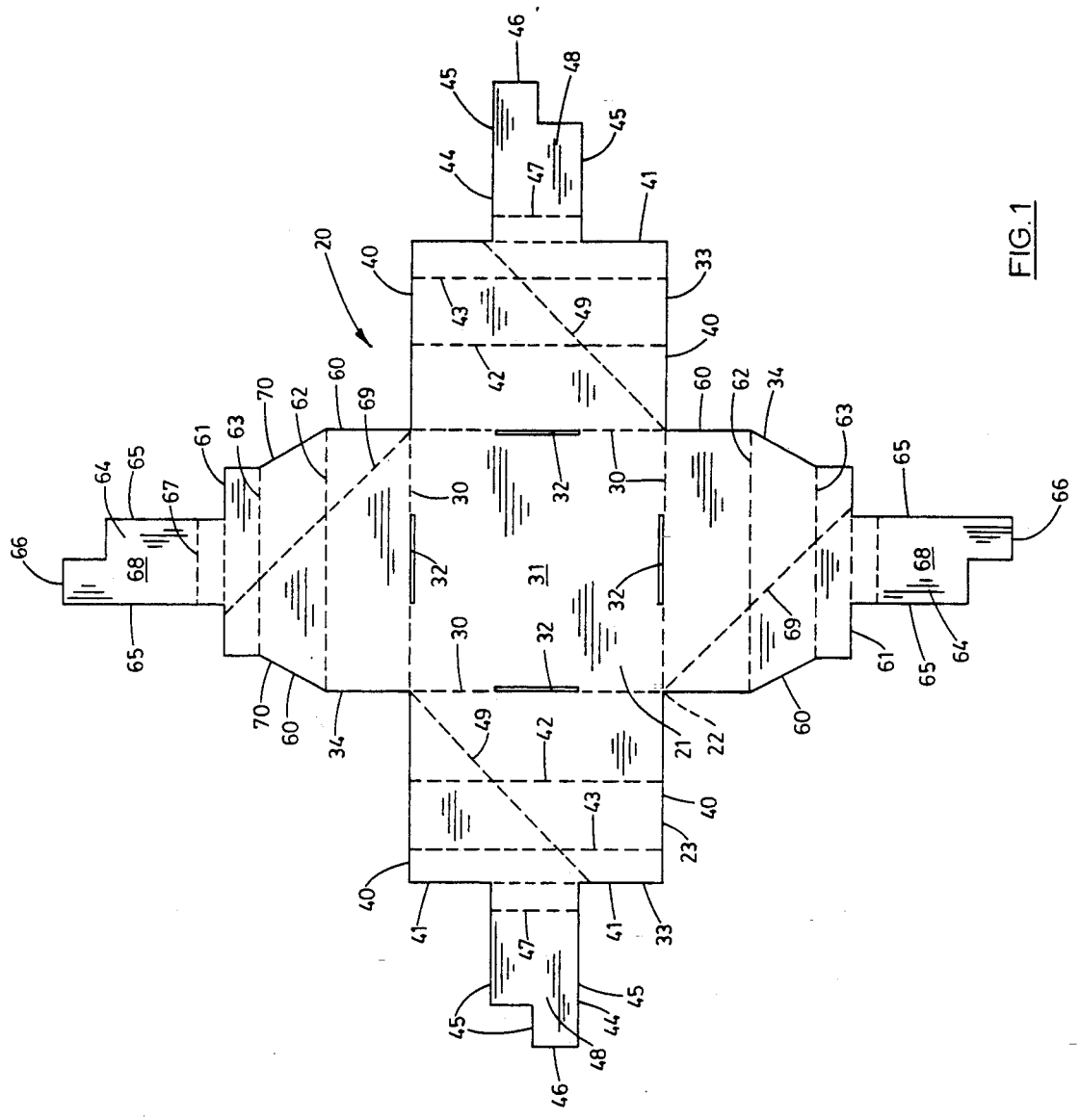
FIG. 1 is a top plan view of a blank, or sheet, employed in the construction of the container of the present invention.
Figure 2:
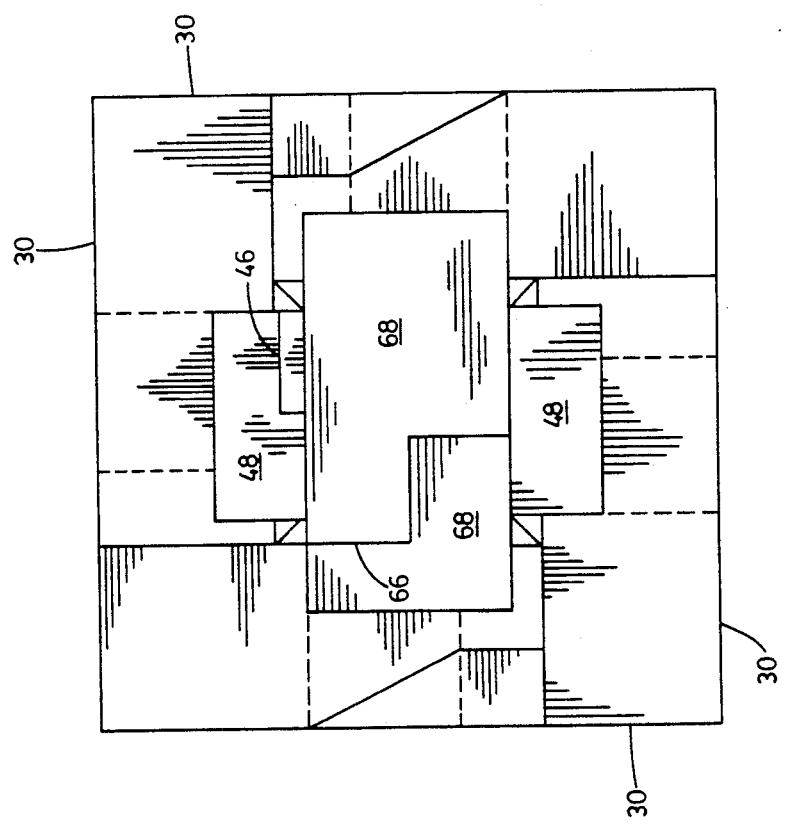
FIG. 2 is a top plan view of the container of the present invention shown in a fully collapsed configuration suitable for transport and storage.

As will subsequently become more clearly apparent, the container of the present invention can be constructed in a variety of different forms. The container can be constructed, if desired, out of rigid materials such as metal, plastic, wood, or the like, so as to have the structure hereinafter described and shown best in FIGS. 6 and 7. However, in the preferred embodiment of the present invention, the container is constructed of an inexpensive material permitting the container to be sold at a price permitting it to be disposed of after one or only a few usages thereby avoiding the inconvenience of storage. Still further, in the preferred embodiment, the container is so constructed in a form permitting it to be sold either in a flattened, blank type configuration such as shown in FIG. 1, or in an assembled but collapsed configuration such as shown in FIG. 2. Finally, the container, in the preferred embodiment, can be sold in the flattened, blank type configuration shown in FIG. 1; assembled by the user to the configuration shown in FIGS. 6 and 7; employed for its designed purposes hereinafter described; and then returned to the collapsed configuration shown in FIG. 2 for storage and subsequent reuse. The particular form to be employed is solely dependent upon the preferences of the manufacturer and ultimate consumer.

Accordingly, reference is now invited to FIG. 1 wherein the blank or sheet is generally indicated by the numeral 20. The blank or sheet, for illustrative convenience, will be understood to be constructed of heavy paper or cardboard having a flat upper surface 21 and an opposite, flat, lower surface 22. The sheet has a peripheral edge 23. The sheet is preferably coated with a wax or other coating of food grade which will protect it in use from urine, water and other substances which would otherwise cause the sheet to deteriorate. The coating is preferably of food grade so that animals will not be harmed by gnawing on the resulting container during use.

The sheet 20 has a plurality of fold lines generally indicated by the dotted lines hereinafter described and shown in the drawings. The fold lines, depending upon the material, can be simply printed on the upper and/or lower surfaces 21 and 22, respectively, of the sheet or can be score lines which facilitate folding of the sheet into the configuration hereinafter to be described.

The sheet 20 has four first fold lines 30 defining a rectangular portion 31 for the sheet and where adjacent first fold lines are disposed at right angles to each other. A slot 32 extending through the sheet is coincident with each of the first fold lines and centrally located relative thereto, as shown in FIG. 1. The first fold lines 30 on the left and right, as shown in FIG. 1, individually designate first lateral portions 33 extending in opposite directions from the rectangular portion 31 of the sheet. The upper and lower first fold lines 30, as shown in FIG. 1, individually designate second lateral portions 34 of the sheet. It will be noted that the first and second lateral portions differ from each other slightly, as will hereinafter be described.

Referring more particularly to the first lateral portions 33 of the sheet 20, each first lateral portion has opposite lateral edges 44 which extend to a distal edge 41. Each first lateral portion has a second fold line 42 parallel to its respective first fold line 30 and interconnecting the opposite lateral edges 40 thereof. Each first lateral portion has a third fold line 43 parallel to its respective first and second fold lines and extending between the opposite lateral edges 40. Each first lateral portion has a fastening portion 44 extending outwardly from the distal edge 41 and having opposite lateral edges 45. The opposite lateral edges 45 extend to a distal edge 46 of its respective fastening portion 44. A fourth fold line 47 extends across each fastening portion interconnecting the lateral edges 45 thereof and disposed in parallel relation to the first, second and third fold lines. The area of the fastening portion between the fourth fold line and the distal edge 46 constitutes a fastening tab 48. A fifth fold line 49 extends diagonally across each first lateral portion from the juncture of the first fold lines meeting at one corner of the first lateral portion, across the second and third fold lines 42 and 43 to the distal edge 41 slightly offset from its respective fastening portion 44. It will be seen that the fifth fold lines 49 of the respective first lateral portions 33 are parallel to each other and extend in the diagonal attitude previously described from junctures of the respective first fold lines oriented diagonally relative to each other across the rectangular portion 31.

Each of the second lateral portions 34 has opposite lateral edges 60 and a distal edge 61. Second fold lines 62 individually extend across the second lateral portions interconnecting the opposite lateral edges 60 and parallel to their respective first fold lines 30. Third fold lines 63 interconnect the opposite lateral edges 60 and are individually disposed in spaced, parallel relation to their respective second fold lines 62. The second lateral portions include fastening portions 64 individually extending outwardly from the distal edges 61 of the respective second lateral portions. Each of the fastening portions has opposite lateral edges 65 and extends to a distal edge 66. A fourth fold line 67 extends across each of the fastening portions interconnecting the lateral edges 65 disposed in parallel relation to the distal edge 61. The portion of each fastening portion between the fourth fold line 67 and the distal edge 66 constitutes a fastening tab 68. Each of the second lateral portions 34 has a fifth fold line 69 extending diagonally across the second lateral portion between the juncture of two of the first fold lines thereof and the distal edge 61 thereof just offset from its respective fastening portion 64. Upon reference to FIG. 1, it will be seen that the fifth fold lines 69 of the second lateral portions 34 are parallel to each other. It will also be seen that the fifth fold lines individually extend from the junctures of a pair of the first fold lines disposed relative to each other diagonally across the rectangular portion 31 of the sheet 20. It will also be seen that a fifth fold line 49 or 69 extends from each of the junctures of, or corners formed by, the first fold lines.

Figure 7:
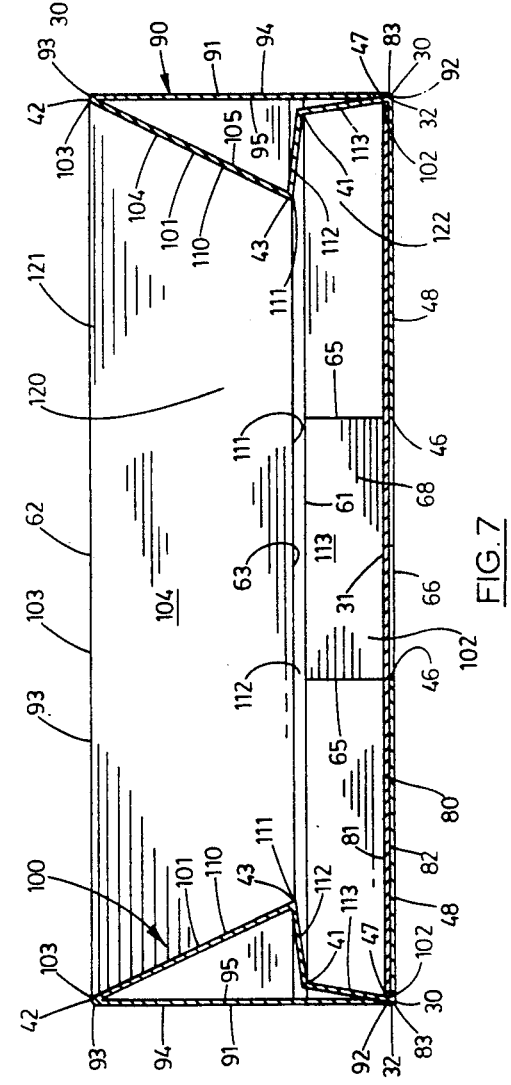
FIG. 7 is a transverse vertical section taken on lines 7—7 in FIG. 6.

As previously noted, the container 10 of the present invention can be constructed in a rigid, fully assembled form having all of the portions hereinafter to be described, or in a form constructed by folding the sheet 20 as will also hereinafter be described. In order most conveniently to describe these embodiments of the invention, the assembled container will now be described. Referring more particularly to FIGS. 6 and 7, the container 10 has a bottom 80 which is coextensive with the rectangular portion 31 of the sheet 20. The bottom has an upper surface 81 and an opposite lower surface 82. The bottom has lateral edges 83 defining a rectangle and which are individually coextensive with the first fold lines 30 of the sheet.

The container 10 includes a wall, or wall assembly, 90 constructed of four wall members 91. In the embodiment of the invention wherein the container 10 is constructed by folding the sheet 20, each of the wall members 91 is formed by folding of a first or second lateral portion 33 or 34. Each of the wall members has a lower edge 92 coextensive with one of the lateral edges 83 of the bottom 80 and an upper edge 93. Each of the wall members has an outer surface 94 and an inner surface 95. Adjacent wall members are joined along corner junctures 96 creating the box-like configuration shown in FIG. 6. Depending upon the form of the invention and the preferences of the manufacturer and/or user, adjacent wall members can be secured relative to each other by extending adhesive tape, or other suitable fastening means, along the corner junctures 96 to retain the container in the box-like configuration, shown in FIG. 6.

The wall assembly 90 mounts an interior panel assembly 100 therewithin. The interior panel assembly is composed of an interior panel 101 secured on, and in covering relation to, the inner surface 95 of each wall member 91. Each interior panel has a lower edge 102 coextensive with the adjacent lateral edge 83 of the bottom 80 and an upper edge 103. Each of the interior panels has an outer surface 104 and an opposite inner surface 105.

In the embodiment of the invention formed by folding of the sheet 20, the interrelationship of the respective fold lines of the sheet to the structure of the interior panel 101 can, perhaps, best be seen upon reference to FIG. 7. As previously noted, each lateral edge 83 of the bottom 80 is coextensive with a first fold line 30. The upper edge 93 of each wall member is coextensive with a second fold line 42 or 62 of its respective first or second lateral portion 33 or 34.

Returning again to the structure of the container 10 as shown in FIGS. 6 and 7, each of the interior panels 101 has a confining member, or sloped portion, 110 extending downwardly and inwardly from the upper edge 93 of the wall member to an inwardly projecting edge 111. Each interior panel has a return portion 112 extending outwardly beneath the sloped portion 110 and toward the inner surface 95 of the wall member 91 and a brace portion 113 extending downwardly to the adjacent lateral edge 83 of the bottom 80.

Figure 8:
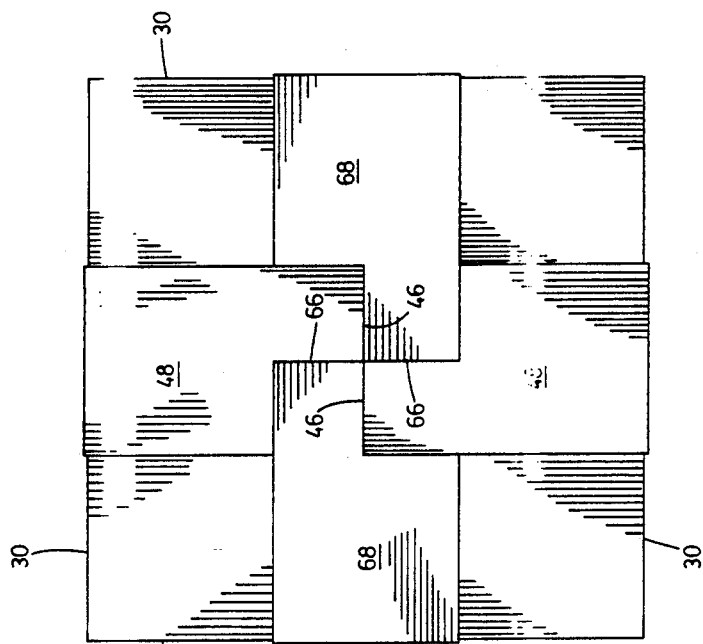
FIG. 8 is a bottom plan view of the container taken from a position indicated by lines 8—8 in FIG. 6.

In the embodiment of the container constructed from the sheet 20, the third fold lines 43 and 63 of the respective first and second lateral portions 33 and 34 are individually coextensive with the inwardly projecting edges 111. The distal edges 41 and 61, respectively, of the first and second lateral portions are coextensive with the junctures of the return and brace portions 112 and 113. The fourth fold lines 47 and 67 are coextensive with the lateral edges 83 of the bottom 80. As best shown in FIG. 6, the sloped portion 110 of the adjacent interior panels form corner junctures 114 as permitted by the tapered portions 70 of the second lateral portions 34 of the sheet 20. The corner junctures 114 can be interconnected using adhesive tape or any other suitable fastening means. Similarly, the fastening tabs 48 and 68 of the respective first and second lateral portions 33 and 34 are individually slidably inserted through the slots 32 of the sheet and disposed in overlapping engagement with the lower surface 82 of the bottom 80, as shown in FIG. 8. The fastening tabs may adhesively be retained in position using adhesive tape or other suitable fastening means.

Referring again to FIGS. 6 and 7, the wall assembly 90 heretofore described bounds a confining area generally indicated at 120 accessible through a mouth 121 defined by the upper edges 93 of the wall members 91. The area above the upper surface 81 of the bottom 80 and beneath the inwardly projecting edge 111 and return portion 112 of each interior panel defines a compartment, or recess, 122 dimensioned for the receipt of an infant animal as may be required during use.

OPERATION

The operation of the described embodiment of the present invention is believed to be clearly apparent and is briefly summarized at this point. Where the container 10 is constructed in a finished, rigid and uncollapsible form, its operation and usage are as will hereinafter be described.

In the embodiment of the invention where the container is formed from the sheet 20 or in the embodiment where the container, while formed from the sheet 20, is collapsible, but not conveniently returnable to the flattened sheet 20 shown in FIG. 1, the description of the assembly of these two embodiments should be viewed in two stages. The first stage is the formation of the container from the sheet 20 shown in FIG. 1. The second stage is the collapsing of the container, once assembled, from the fully assembled configuration shown in FIG. 6 to the collapsed configuration shown in FIG. 2 and subsequently reerecting of the container in assembled form from the collapsed configuration shown in FIG. 2.

The first stage of assembly from the sheet shown in FIG. 20 can, perhaps, most easily be achieved by first folding the sheet along its respective first fold lines 30, second fold lines 42 and 62, third fold lines 43 and 63, fourth fold lines 47 and 67 and fifth fold lines 49 and 69. Once these creases are formed, movement of the various portions of the sheet through the stages of assembly hereinafter to be described can more readily be achieved.

The first lateral portions 33 are first folded upwardly along the first fold lines 30 thereby forming the wall members 91. The first lateral portions are then folded along the second fold lines 42 toward each other and downwardly at sloping angles to form the sloped portions 110. The first lateral portions are then folded along the distal edge 41 back beneath the sloped portions 110 so formed and the fastening portion 44 individually extended through the slots 32. The fastening portions are then individually folded along the fourth fold lines 47 to fold the fastening tabs 48 into facing engagement with the lower surface 82 of the bottom 80 in the overlapping relation shown in FIGS. 7 and 8.

The foregoing process is then repeated with the second lateral portions 34. Each second lateral portion is first folded upwardly along its respective fold line 30 to form a wall member 91. The second lateral portions are then individually folded along the second fold lines 62 toward each other and downwardly at sloping angles to form the sloped portions 110. As can be seen in FIG. 6, the tapered portions 70 of the opposite lateral edges 60 accommodate the sloped portions 110 of the adjacent wall members to permit all of the sloped portions 110 to slope inwardly of the container at approximately the same angle shown in FIG. 7.

Next, the second lateral portions 34 are folded along the third fold lines 63 beneath the sloped portions 110 and back toward the inner surface 95 of the wall members 91. The second lateral portions are then folded along the distal edges 61 and their respective fastening portions 64 are inserted through their respective slots 32. Subsequently, the second lateral portions are folded along their fourth fold lines 67 and the fastening tabs 68 folded into facing engagement with the lower surface 82 of the bottom 80 as shown in FIGS. 7 and 8. The respective fastening tabs 48 and 68 amy adhesively be retained in the overlapping configuration shown in FIGS. 7 and 8 by any suitable means such as adhesive tape.

Similarly, and as previously described, suitable fastening means such as adhesive tape can be applied to the corner junctures 96 of the wall members 91 and the corner junctures 114 of the sloped portions 110 permanently, or semi-permanently, to retain the container 10 in the configuration shown in FIG. 6.

When so assembled, the container 10 can be employed in the manner of a conventional whelping box in that, prior to birth, the pregnant female can be placed in the confining area 120 several days prior to birth to adapt to and become comfortable with the container. Subsequent to birth, the height of the wall assembly 90 is such as to prevent escape of the infant animals from the confining area during the desired period of their infancy. In accordance with conventional practice, the mother also occupies the confining area nursing the infant animals as necessary and otherwise caring for their needs. During this period of confinement, should any of the infant animals become trapped between the back, or other portion, of the mother and an adjacent wall member 90, the infant animal can, in effect, be received in the recess 122 by pressure of the mother against the infant animal. This prevents suffocation, or other injury, to the infant animal and permits it to be repositioned when noticed by those attending the infant animals. As the infants mature and instinctively attempt to escape from the confining area 20, the sloped portions 110 of the interior panel assembly 100 prevent the infants from achieving sufficient traction thereon to escape over the upper edge 93 of the wall assembly 90.

In the embodiment of the invention constructed from the sheet 20, the material from which the sheet is fabricated, such as heavy paper or cardboard, is sufficiently inexpensive to permit the container simply to be disposed of after a single or several usages. Accordingly, if desired, the container, once used, can simply be thrown away.

Figure 3:
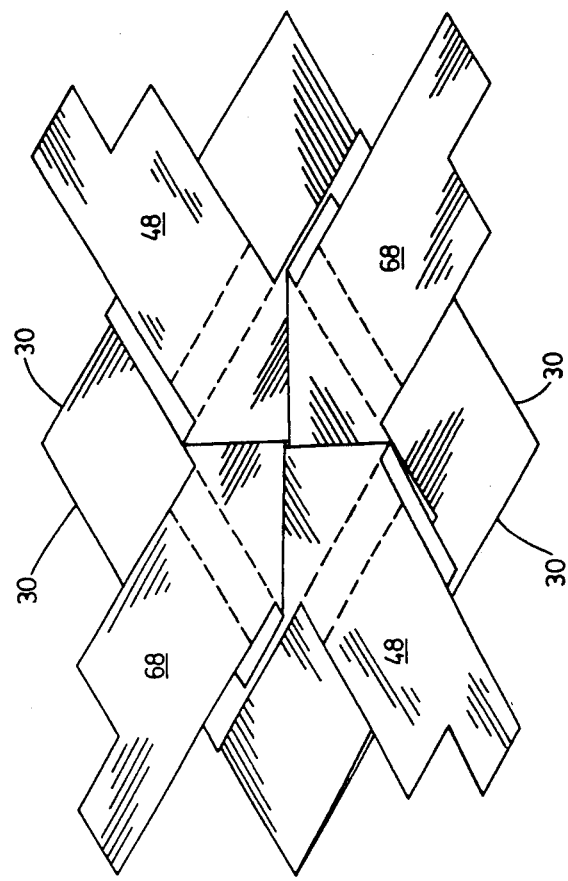
FIG. 3 is a perspective view of the container of FIG. 2 shown in a first assembly configuration.
Figure 4:
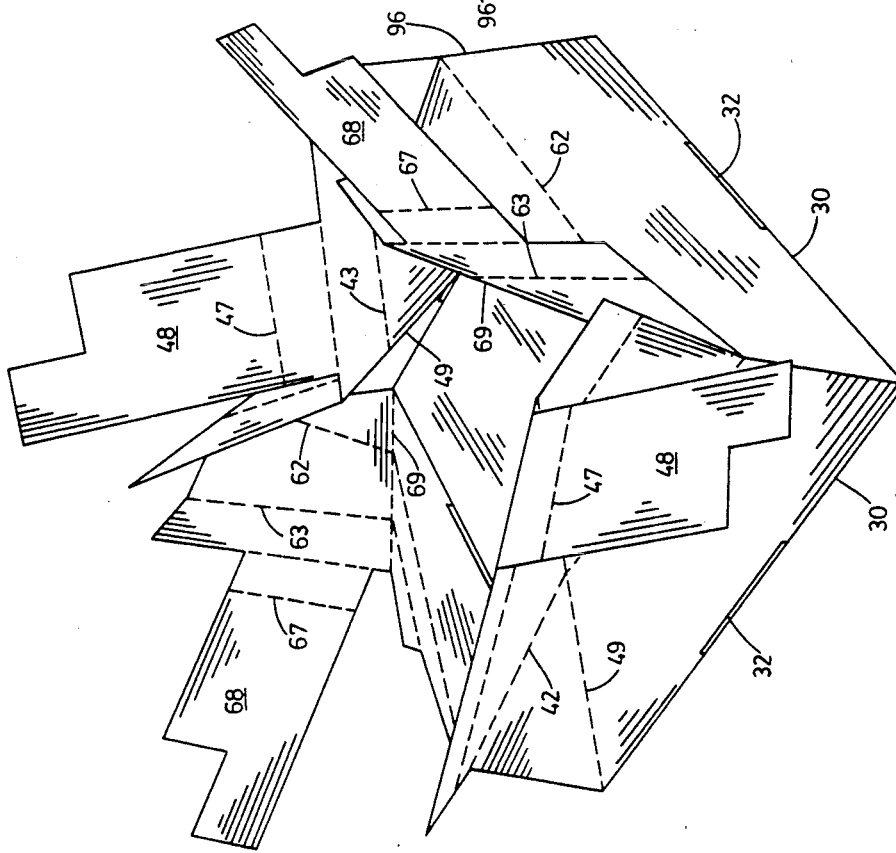
FIG. 4 is a perspective view of the container of FIGS. 2 and 3 in a second assembly configuration.
Figure 5:
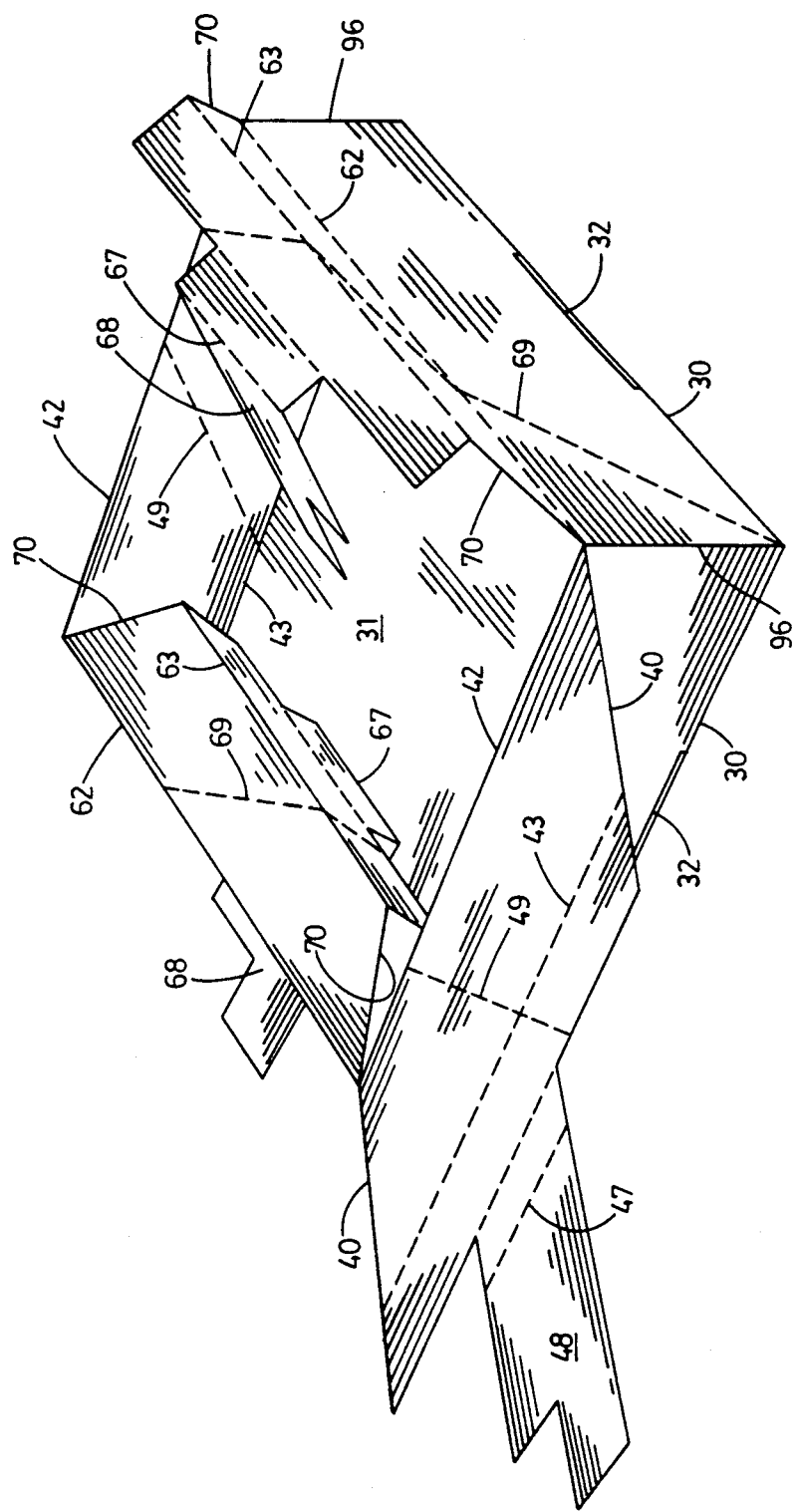
FIG. 5 is a perspective view of the container of FIGS. 2, 3 and 4 shown in a third assembly configuration.

If desired, however, the container 10 can be collapsed for transport and storage purposes for subsequent reuse when desired. Such collapsing of the container is first achieved by removing the adhesive tape from the fastening tabs 48 and 68 to free them for disassembly of the container. When the adhesive tape has been removed, each fastening portion 44 and 64 is slidably removed from its respective slot 32 and the first and second lateral portions 33 and 34, respectively, elevated to the positions shown in FIG. 4. The first and second lateral portions are then individually folded along their respective fifth fold lines 49 and 69 as can best be seen in FIG. 4. This permits each first and second lateral portion to be folded into an offset, collapsed configuration wherein the fifth fold lines adjacent the outer extremities thereof are interlocked as shown in FIG. 3 with the fastening portions 44 and 64 extending outwardly therefrom in four different directions as shown in FIG. 3. The fastening portions can then be folded along their respective fourth fold lines 47 and 67 toward each other in overlapping relation as shown in FIG. 2. This is the fully collapsed configuration for the container and it can be held in this fully collapsed configuration, if desired, by applying a small strip of adhesive tape to the overlaying fastening tabs 48 and 68 to retain it in the fully collapsed configuration.

When it again becomes necessary to use the container 10 which has been stored in the collapsed configuration shown in FIG. 2, the reerecting of the container to the form shown in FIG. 6 is achieved by reversal of the steps heretofore described and shown successively in FIGS. 2, 3, 4, 5 and 6.

Therefore, the container for housing mobile work objects of the present invention provides a container which is operable to ensure that all of the benefits sought in the use of such a container, or whelping box, can be achieved by protecting the infant animals from inadvertent injury by the mother and by ensuring that the infant animals cannot escape from the container until desired by the user; which can be constructed of extremely inexpensive materials so as to be entirely disposable if desired; and which, can, if desired, be reusable by conveniently and dependably placing the container in a fully collapsed configuration convenient for transport and storage and from which the container can again conveniently be erected to a fully assembled configuration for reuse.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. A container for housing one or more infant and adult animals comprising a substantially flat bottom adapted to be rested on a surface of support; a wall mounted on said bottom in upstanding relation and, with said bottom, defining a confining area for said animals accessible through a mouth bounded by said wall; a panel borne in covering relation to said wall within said confining area and so configured as to form a projection upwardly spaced from th bottom and inwardly spaced from the wall to define a recess for receiving an infant animal to protect the infant animal from an adult animal which would otherwise lay thereon, and a confining member, extending upwardly and outwardly from said projection and to said mouth in a configuration resisting movement by the infant animals through the mouth and from the confining area; and wherein said bottom, wall and panel are formed from a single sheet of material adapted to be folded into an assembled attitude forming said container, said sheet having:
   A. a substantially flat rectangular portion defined by first fold lines substantially right-angularly related to adjoining fold lines thereof and each of said first fold lines having an adjacent, substantially parallel slot;
   B. a substantially flat lateral portion contiguous with each of said first fold lines and having opposite lateral edges, a distal edge substantially parallel to its respective first fold line, a second fold line interconnecting said lateral edges substantially parallel to its respective first fold line and a third fold line spaced from and substantially parallel to the second fold line; and
   C. a substantially flat fastening portion contiguous with the distal edge of each lateral portion extending outwardly therefrom and having a fourth fold line substantially parallel to said third fold line and having a fastening tab extending outwardly therefrom whereby said sheet can be folded along the first fold lines to move said lateral portions between said respective first fold line and the second fold line to attitudes substantially right-angularly related to the rectangular portion so that the rectangular portion forms said bottom and the lateral portions between the first fold lines and said second fold line form said wall, said lateral portions between the second and third fold lines thereof inwardly between the adjacent lateral portions and toward the rectangular portion at an oblique angle to form said confining member, said lateral portions between the third fold line and said distal edge outwardly toward the adjacent wall to define a recess and the fastening portion downwardly through the adjacent slot and the fastening tab folded along the fourth fold line and beneath said bottom to retain said sheet in a configuration constituting said assembled attitude.

2. The container of claim 1 wherein said lateral edges of at least two of the lateral portions are tapered intermediate said second and third fold lines to accommodate folding of the sheet to said assembled attitude.

3. The container of claim 2 including means for fastening the sheet in said assembled attitude by interconnecting the adjacent walls of the lateral portions.

4. The container of claim 3 wherein each lateral portion has a fifth fold line extending diagonally across the lateral portion from the first fold line to said distal edge and the fifth fold lines of the respective lateral portions are disposed in complementary angles to each other whereby from said assembled attitude the container can be folded into a collapsed attitude for storage or transport by removing the fastening portion of each lateral portion from its respective slot, folding each lateral portion about its respective second fold line, folding each lateral portion along its respective fifth fold line, folding each lateral portion along its respective first fold line and into collapsed attitudes overlaying said rectangular portion and folding said fastening portions along their respective fourth fold lines overlaying said lateral portions to form said collapsed attitude.

5. A container for housing one or more infant and adult animals comprising a substantially flat bottom adapted to be rested on a surface of support: a wall mounted on said bottom in upstanding relation and, with said bottom, defining a confining area dimensioned to receive said animals and accessible through a mouth bounded by said wall; and a panel borne in covering relation to said wall within said confining area and extending from an inward lower edge upwardly spaced from said bottom to define a recess dimensioned to receive a newborn animal and extending upwardly and outwardly to the wall at an angle resisting movement of an infant animal from said confining area.

6. A container for housing newborn animals comprising a bottom adapted to be rested on a surface of support; a wall mounted on said bottom in upstanding relation and, with said bottom, defining a confining area for said animals accessible through a mouth bounded by said wall; and a panel borne in covering relation to said wall within said confining area and so configured as to form a projection upwardly spaced from the bottom and inwardly spaced from the wall to define a recess dimensioned to receive a newborn animal therewithin in protective relation, and a confining member extending upwardly and outwardly from said projection and to said mouth in a configuration resisting movement by a newborn animal through the mouth and from the confining area, and wherein said bottom, wall and panel are formed from a single sheet of material adapted to be folded into an assembled attitude forming said container.

7. The container of claim 6 wherein said sheet is adapted to be folded into said assembled attitude for use, unfolded and refolded into flattened attitude for storage.

8. A container comprising a bottom, a wall mounted on the bottom in upstanding relation so as to define an interior area accessible through a mouth bounded by the wall and a panel disposed in covering relation to the wall and so configured as to form a projection upwardly spaced from the bottom and inwardly spaced from the wall to form a recess and a member extending upwardly and outwardly from said projection and to the mouth and the container formed from a sheet of material adapted to be folded into an assembled attitude forming said container, said sheet having:
   A. a substantially flat rectangular portion defined by first fold lines substantially right-angularly related to adjoining fold lines thereof and each of said first fold lines having an adjacent, substantially parallel slot;
   B. a substantially flat lateral portion contiguous with each of said first fold lines and having opposite lateral edges, a distal edge substantially parallel to its respective first fold line, a second fold line interconnecting said lateral edges substantially parallel to its respective first fold line and a third fold line spaced from and substantially parallel to the second fold line; and C. a substantially flat fastening portion contiguous with the distal edge of each lateral portion extending outwardly therefrom and having a fourth fold line substantially parallel to said third fold line and having a fastening tab extending outwardly therefrom whereby said sheet can be folded along the first fold lines to move said lateral portions between said respective first fold line and the second fold line to attitudes substantially right-angularly related to the rectangular portion so that the rectangular portion forms said bottom and the lateral portions between the first fold lines and said second fold line form said wall, said lateral portions between the second and third fold lines thereof inwardly between the adjacent lateral portions and toward the rectangular portion at an oblique angle to form said member, said lateral portions between the third fold line and said distal edge outwardly toward the adjacent wall to define said recess and the fastening portion downwardly through the adjacent slot and the fastening tab folded along the fourth fold line and beneath said bottom to retain said sheet in a configuration constituting said assembled attitude.

* * * * *

UNITED STATES PATENT AND TRADEMARK OFFICE
CERTIFICATE OF CORRECTION

PATENT NO. : 5,287,825
DATED : February 22, 1994
INVENTOR(S) : Thomas R. Wheeler; Vicki F. Wheeler It is certified that error appears in the above-identified patent and that said Letters Patent is hereby corrected as shown below:

Column 9, line 11, delete "th" and substitute

---the---.

Signed and Sealed this

Fifth Day of July, 1994

Attest:

BRUCE LEHMAN

Attesting Officer  Commissioner of Patents and Trademarks